United States Patent
Morimoto et al.

(10) Patent No.: US 6,889,569 B2
(45) Date of Patent: May 10, 2005

(54) CHANGE SPEED APPARATUS FOR A WORKING VEHICLE THAT ENGAGES IN AN OPERATION WHILE MOVING FORWARD AND BACKWARD

(75) Inventors: Isamu Morimoto, Tondabayashi (JP); Hidetaka Yoshioka, Osaka (JP); Megumi Sawai, Izumi (JP); Kenichi Sato, Osaka (JP); Kiyoshi Hanamoto, Sakai (JP); Yasunobu Yamaue, Izumi (JP); Shinji Osawa, Sakai (JP); Makoto Saegusa, Sakai (JP); Shinji Yamamoto, Sakai (JP); Daisuke Kobayashi, Sakai (JP); Tatsuyuki Kashimoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/215,385

(22) Filed: Aug. 8, 2002

(65) Prior Publication Data

US 2003/0033898 A1 Feb. 20, 2003

(30) Foreign Application Priority Data

Aug. 9, 2001 (JP) ........................................ 2001-242758
Aug. 9, 2001 (JP) ........................................ 2001-242759
Aug. 9, 2001 (JP) ........................................ 2001-242760

(51) Int. Cl.[7] ............................ F16H 59/00; F16H 3/08; B60K 20/00
(52) U.S. Cl. ........................ 74/335; 74/329; 74/473.33
(58) Field of Search ................ 74/664, 665 G, 74/329, 376, 15.4, 404, 15.66, 15.69, 335, 473.3, 473.33, 471 XY, 473.19

(56) References Cited

U.S. PATENT DOCUMENTS 3,714,846 A * 2/1973 Louis et al. .................. 74/335
3,993,175 A * 11/1976 Beveridge ................. 74/47 XY
4,051,915 A * 10/1977 Behrens .................... 75/473.33
4,060,157 A * 11/1977 Hillstrom ................. 74/473.19
4,216,680 A * 8/1980 Hayashi et al. ........... 74/473.33
4,294,137 A * 10/1981 Piret et al. ................. 74/665 G
4,438,657 A * 3/1984 Nobis ....................... 74/473.33
4,549,637 A * 10/1985 Huckler et al. ............. 74/473.3
4,648,040 A * 3/1987 Cornell et al. ................ 701/52
4,698,048 A * 10/1987 Rundle ..................... 474/473.3
4,856,355 A * 8/1989 Ishimaru ........................ 74/11
5,351,570 A * 10/1994 Mizunuma et al. ............ 74/335
5,901,606 A * 5/1999 Umemoto et al. .......... 74/15.66
6,530,290 B2 * 3/2003 Matsufuji et al. ............. 74/335

FOREIGN PATENT DOCUMENTS

JP          2129385 A  *  5/1984

* cited by examiner

Primary Examiner—Roger Pang
(74) Attorney, Agent, or Firm—Webb Ziesenheim Logsdon Orkin & Hanson, P.C.

(57) ABSTRACT

A change speed apparatus for a working vehicle includes a first shaft for receiving driving torque from an engine, a second shaft for transmitting the driving torque to a rear wheel differential, a change speed mechanism for changing speed of the driving torque received from the first shaft and transmits the driving torque to the second shaft, and a shift lever for selectively switching the change speed mechanism. The change speed mechanism has a high forward speed stage, a low forward speed stage, a backward drive stage, and a neutral stage. The shift lever is movable along a transverse control path for the neutral stage, a first longitudinal control path for the high forward speed stage, a second longitudinal control path for the low forward speed stage, and a third longitudinal control path for the backward drive stage.

12 Claims, 11 Drawing Sheets

PRIOR Arts

US 6,889,569 B2

CHANGE SPEED APPARATUS FOR A WORKING VEHICLE THAT ENGAGES IN AN OPERATION WHILE MOVING FORWARD AND BACKWARD

BACKGROUND OF THE INVENTION

1. Field of the Invention

This invention relates to a change speed apparatus for a working vehicle that engages in an operation while moving forward and backward. The change speed apparatus is constructed to produce a high forward speed stage for changing a speed of torque received from an input shaft to a high forward speed and transmitting it to an output shaft, a low forward speed stage for changing the speed of torque received from the input shaft to a low forward speed and transmitting it to the output shaft, a backward speed stage for changing the speed of torque received from the input shaft to a low backward speed and transmitting it to the output shaft, and a neutral stage.

2. Description of the Related Art

This type of change speed apparatus is disclosed in Japanese Patent Publication (Unexamined) H11-78574, for example. This apparatus has an auxiliary gear change speed mechanism that produces a low forward speed stage and a backward speed stage, which is incorporated into a main gear change speed mechanism that produces four, a first to a fourth, speeds. The main gear change speed mechanism is shiftable by a first shift lever, while the auxiliary gear change speed mechanism is shiftable by a second shift lever. With the second shift lever placed in a low forward speed position, a high forward speed position or a backward position, the first shift lever is appropriately operable to set a total of four speeds, i.e. the first speed, second speed, third speed and fourth speed. Consequently, eight forward speeds and four backward speeds in total may be produced. In this change speed apparatus, however, components of the main gear change speed mechanism and auxiliary gear change speed mechanism are arranged together in a complicated manner. Thus, the change speed apparatus has a complex construction, with a disadvantage of assembling difficulties.

Regarding control positions of the second shift lever which is the shift lever of the auxiliary gear change speed mechanism, as shown in FIG. 13A, a low forward speed position L is disposed to one side (vehicle's forward moving side) of a neutral region N extending transversely, and a high forward speed position H and a reverse position R are arranged to the other side (vehicle's backward moving side) of the neutral region N. A mirror image of this arrangement is shown in FIG. 13B. Such an arrangement of control positions provides good operability, with a linear shift control path linking the low forward speed position L and reverse position R, allowing a switching between low forward speed movement and backward movement, which is required frequently during an operation, to be carried out only by moving the shift lever linearly. However, though low forward speed position L is disposed to the vehicle's forward moving side with respect to the neutral region N, the high forward speed position H is disposed to the side opposite from the low forward speed position L (vehicle's backward moving side) with respect to the neutral region N. This causes an inconvenience that, for a fast forward movement, the shift lever has to be moved in the opposite direction (i.e. vehicle's backward moving direction) to a slow forward movement.

SUMMARY OF THE INVENTION

An object of this invention is to improve the operability of the above shift lever for selectively switching between a low forward speed stage, a backward speed stage and a neutral stage.

Further, this invention is intended to simplify the construction of a change speed apparatus including a main gear change speed mechanism and an auxiliary gear change speed mechanism noted above.

The above object is fulfilled, according to this invention, by a change speed apparatus for a working vehicle, that is operable by a shift lever to produce a high forward speed stage for changing the speed of the driving torque received from the first shaft to a high forward speed for transmission to the second shaft, a low forward speed stage for changing the speed of the driving torque received from the first shaft to a low forward speed for transmission to the second shaft, a backward drive stage for changing the speed of the driving torque received from the first shaft to a low backward speed for transmission to the second shaft, and a neutral stage, wherein the shift lever is movable along shift control paths including a transverse control path extending transversely, a first longitudinal control path extending longitudinally from one side of the transverse control path, a second longitudinal control path extending longitudinally from the one side of the transverse control path and spaced from the first longitudinal control path, and a third longitudinal control path extending longitudinally from the other side of the transverse control path, the high forward speed stage being selected when the shift lever is operated to an end of the first longitudinal control path, the low forward speed stage being selected when the shift lever is operated to an end of the second longitudinal control path, the backward drive stage being selected when the shift lever is operated to an end of the third longitudinal control path, the neutral stage being selected when the shift lever is operated to the transverse control path.

In this construction, the two positions of the shift lever for setting the forward speed stages are arranged at one side, e.g. forwardly with respect to movement of the vehicle, of the position for the neutral stage. The position for setting the backward drive stage is disposed at the other side of the neutral position, e.g. rearwardly with respect to movement of the vehicle. Thus, the shift lever is operable in the same direction in time of forward movement in two speeds. As a result, the driver can perform the two forward shifting operations naturally and without a sense of incongruity.

In a preferred embodiment of this invention, the second longitudinal control path and the third longitudinal control path extend linearly across the transverse control path. This provides a linear shift control path between the low forward speed position and the backward drive position. A switching between low forward speed movement and backward movement, which is required frequently during an operation, may be carried out smoothly.

As a further preferred embodiment of the invention, the shift lever may be disposed laterally of a driver's seat. Then, a forward and backward stroke of the driver's arm coincides with a forward and backward switching operation of the shift lever, to further smooth the switching between low forward speed movement and backward movement.

In a proposed construction with an advantage, the position of the shift lever that produces the high forward speed stage is disposed more inwardly of the vehicle body than the position of shift lever that produces the low forward speed stage. With this construction, the position for the high forward speed stage, which is used less frequently during an operation, is disposed inwardly of the vehicle body where a control operation tends to be restricted. The position for the low forward speed stage, which is used more frequently, is disposed outwardly of the vehicle body where a control operation is easy to perform. Thus, the frequent operations for switching between low forward speed movement and backward movement may be carried out smoothly.

Further, the change speed mechanism and rear wheel differential may be mounted in a common housing. A main gear change speed mechanism that produces a total of four speed stages, i.e. first to fourth speed stages, may be mounted in a clutch housing. This construction renders the clutch housing compact to secure a sufficient height for the vehicle body between front wheels and rear wheels.

Other features and advantages of this invention will be apparent from the following description of the embodiment to be taken with reference to the drawings.

DESCRIPTION OF THE PREFERRED EMBODIMENTS

Figure 1:
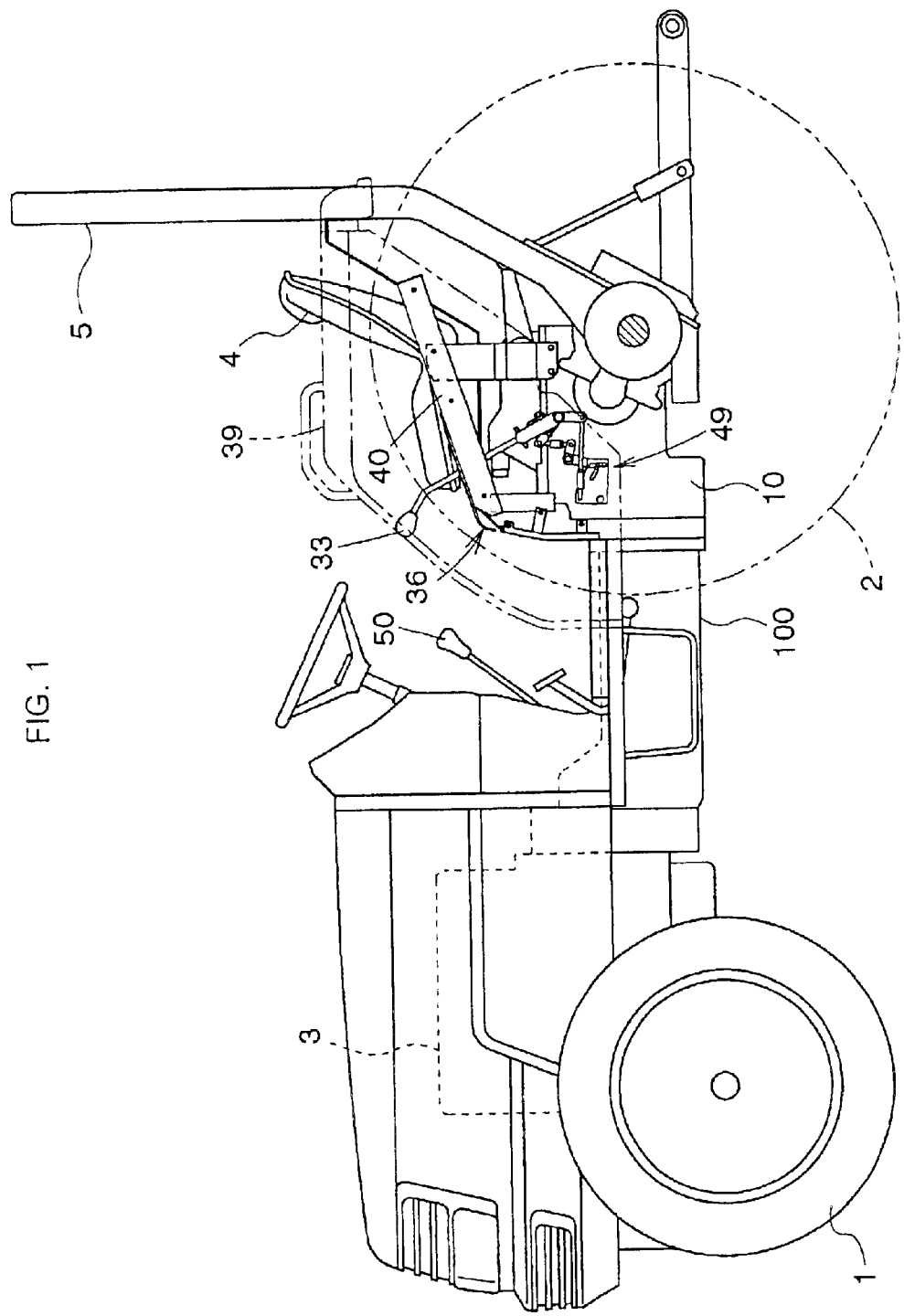
FIG. 1 is a side view of a tractor having a change speed apparatus according to this invention.
Figure 2:
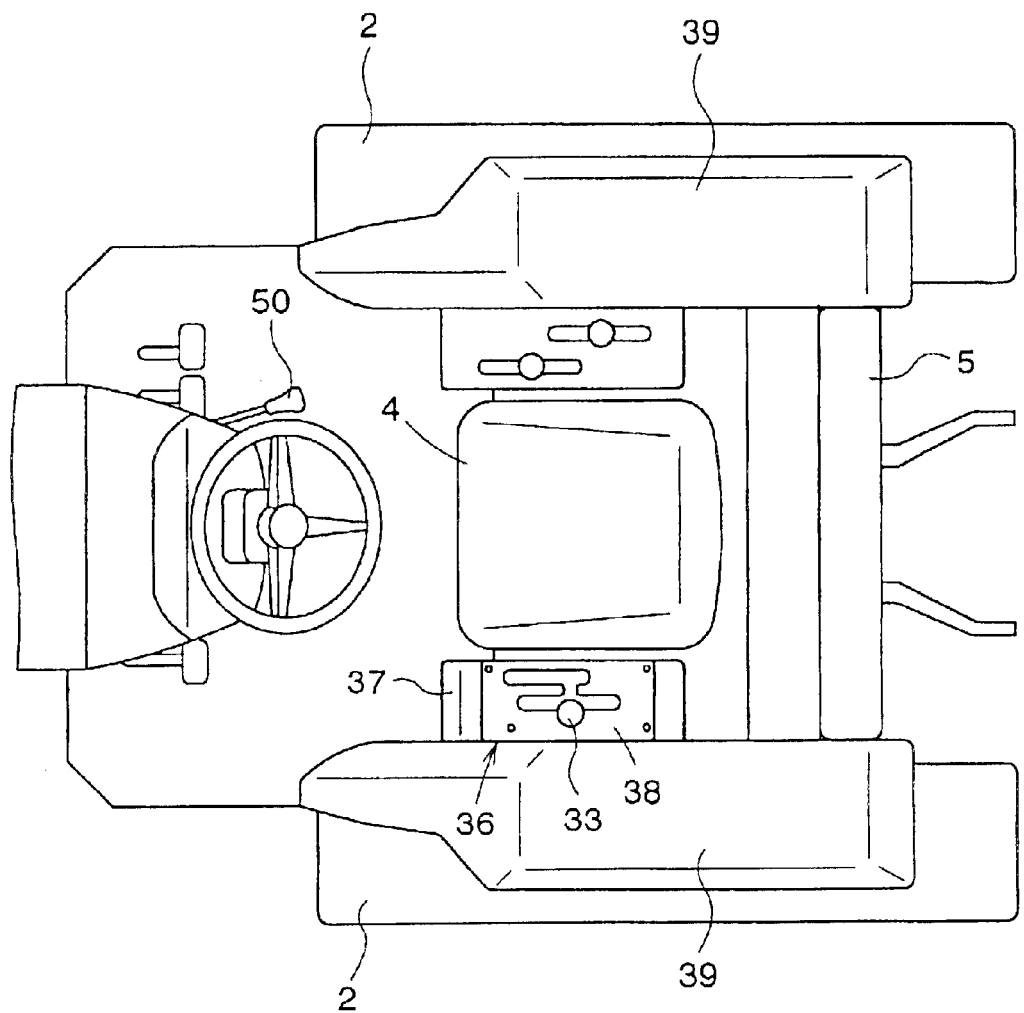
FIG. 2 is a plan view of a portion the tractor shown in FIG. 1.
Figure 3:
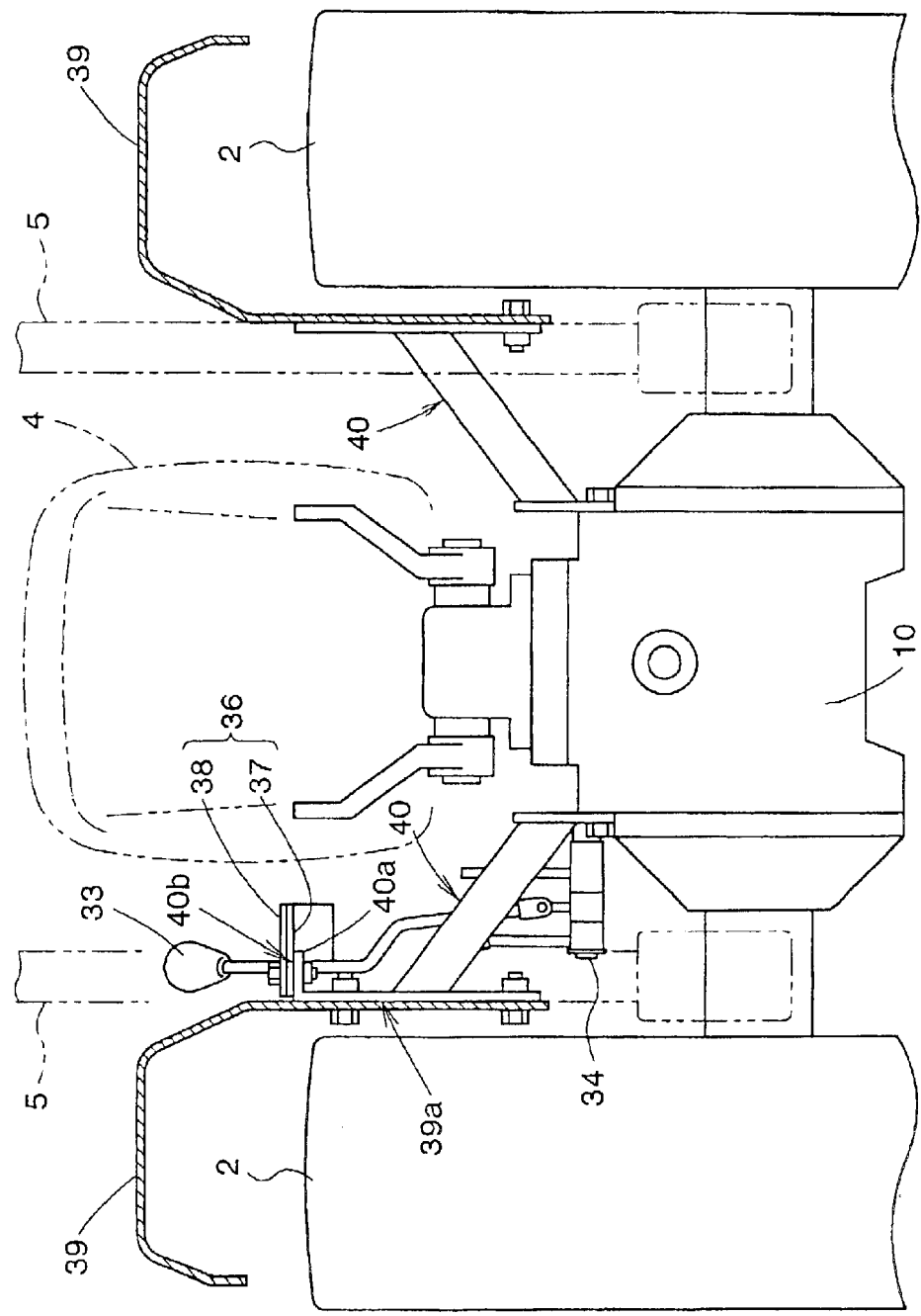
FIG. 3 is a schematic rear view of a portion of the tractor shown in FIG. 1.

FIGS. 1 through 3 show a tractor which is one example of working vehicles having a change speed apparatus according to this invention. The tractor includes a vehicle body having a pair of right and left dirigible front drive wheels 1 and a pair of right and left rear drive wheels 2. The vehicle body has an engine 3 mounted on a front portion thereof, and a driver's seat 4 and a protective frame 5 on a rear portion.

A rear wheel drive line for transmitting driving torque from the engine 3 to the rear drive wheels 2 includes, as core members thereof, a main clutch 7 and a main change speed device 8 housed in a transmission case 100. An auxiliary change speed device 9 is mounted in a rear differential case 10. As seen from FIG. 4, the main change speed device 8 is a gear type change speed mechanism for changing the speed of driving torque received from the main clutch 7 to one of four speeds, i.e. a first, a second, a third and a fourth speeds. The main change speed device 8 is shiftable by a shift lever 50 which is the column shift type and disposed adjacent a steering column. The auxiliary change speed device 9 provides a low-speed stage and a high-speed stage for driving torque received from the main change speed device 8, and has a backward drive stage for reversing the driving torque from the main change speed device 8. Drive output from the auxiliary change speed device 9 is transmitted to a rear wheel differential 6. A differential input gear 6a is disposed at the rear end of a second shaft.

The rear differential case 10 housing the rear wheel differential 6 has a power takeoff shaft 11 attached to the rear thereof. A power takeoff transmission line from the main clutch 7 to the power takeoff shaft 11 includes a power takeoff clutch 12.

Figure 5:
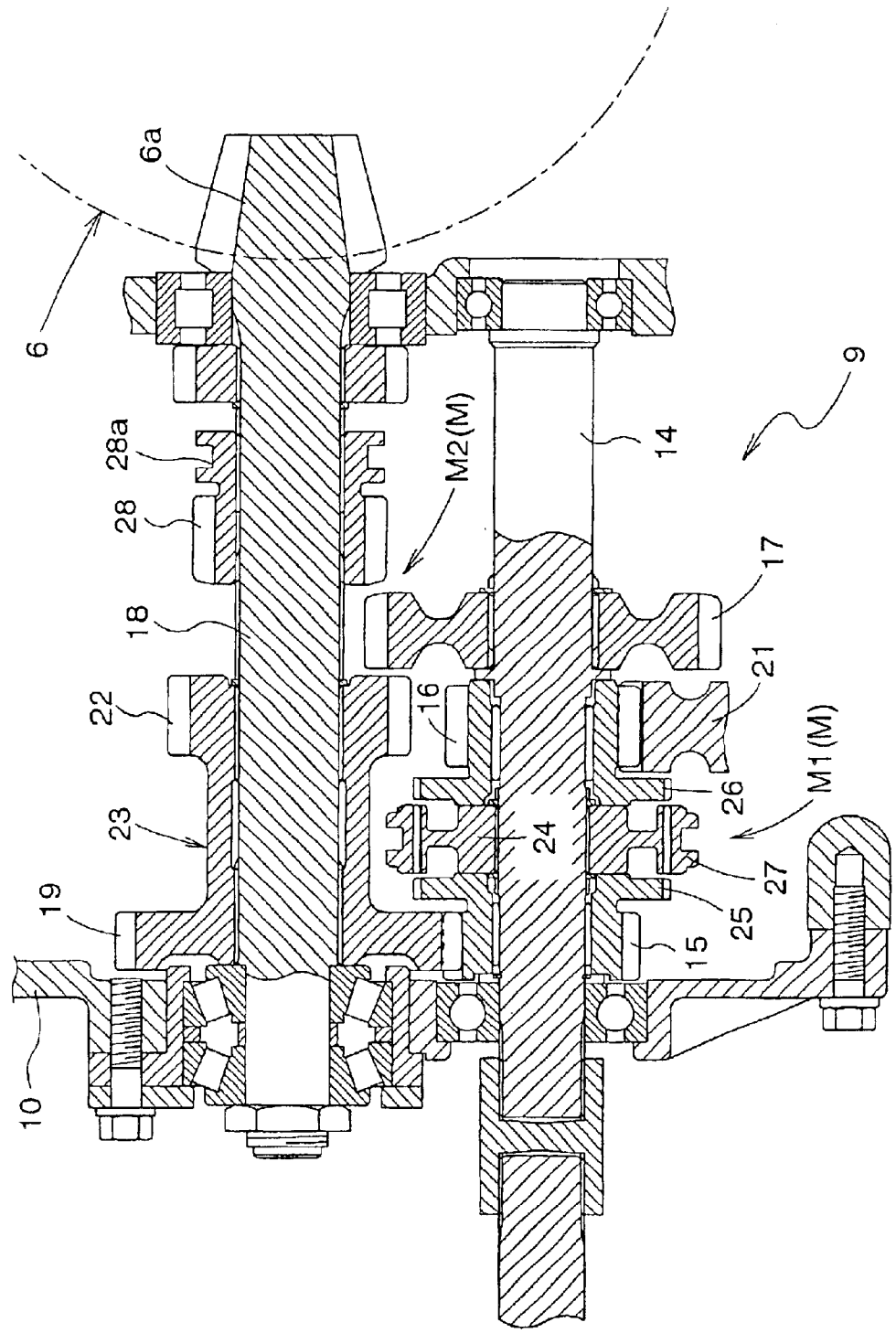
FIG. 5 is a side view in vertical section of an auxiliary change speed device.

As shown in detail in FIG. 5, the auxiliary change speed device 9 is a gear type change speed mechanism M disposed adjacent the rear wheel differential 6. Drive transmission between a first shaft 14 acting as input shaft and a second shaft 18 acting as output shaft is switchable to four states including a low forward speed state (low forward speed stage), a high forward speed state (high forward speed stage), a backing state (backward speed stage) and a neutral state (neutral stage). The change speed mechanism M includes a first gear change speed unit M1 of the constant mesh type and a second gear change speed unit M2 of the gear engaging type arranged axially adjacent each other. The first gear change speed unit M1 is switchable to a low forward speed transmission state (low forward speed stage) for transmitting drive at a low forward speed from the first shaft 14 extending fore and aft (with respect to the vehicle body), to the second shaft 18 extending fore and aft to the rear wheel differential 6, a neutral state (neutral stage) not transmitting drive, and a backing state (backward speed stage) for transmitting backward drive. The second gear change speed unit M2 is switchable to a high forward speed transmission state (high forward speed stage) for transmitting drive at a high forward speed from the first shaft 14 to the second shaft 18, and a neutral state (neutral stage) not transmitting drive. The first gear change speed unit M1 may be the synchromesh type.

The first gear change speed unit M1 includes a low forward speed drive gear 15 and a backward drive gear 16 freely rotatably mounted on the first shaft 14, a clutch unit mounted on the first shaft 14 between the low forward speed drive gear 15 and backward drive gear 16, a driven gear unit 23 mounted on the second shaft 18 not to be rotatable relative thereto. The driven gear unit 23 has a low forward speed driven gear 19 in constant mesh with the low forward speed drive gear 15, and a backward driven gear 22 in constant mesh with the backward drive gear 16 through an idle gear 21. The low forward speed drive gear 15 and backward drive gear 16 have dog teeth 25 and 26 formed on sides thereof opposed to the clutch unit, respectively. The clutch unit includes a clutch hub 24 mounted on the first shaft 14 not to be rotatable relative thereto, and a first clutch sleeve 27 axially slidably mounted peripherally of the clutch hub 24. The first clutch sleeve 27 is slidable leftward for engaging the dog teeth 25 to produce the low forward speed stage. The first clutch sleeve 27 is slidable rightward for engaging the dog teeth 26 to produce the backward drive stage. The neutral stage is produced when the first clutch sleeve 27 engages neither of the dog teeth 25 and 26.

The second gear change speed unit M2 includes a high forward speed drive gear 17 mounted on the first shaft 14 laterally of the backward drive gear 16 away from the clutch, not to be rotatable relative to the first shaft 14, and a high forward speed driven gear 28 mounted on the second shaft 18 to be axially slidable and not to be rotatable relative thereto. The high forward speed driven gear 28 has a sleeve portion 28a for use in sliding the high forward speed driven gear 28 between a first position and a second position. The high forward speed driven gear 28 in the first position engages the high forward speed drive gear 17, and in the second position disengages from the high forward speed drive gear 17. Thus, the high forward speed driven gear 28 acts as a second clutch sleeve.

By shifting both the first clutch sleeve 27 and second clutch sleeve 28 to neutral positions, the neutral state (neutral stage) is produced to effect none of the low forward speed transmission, high forward speed transmission and backward drive transmission. When the first clutch sleeve 27 is shifted to the low forward speed position with the second clutch sleeve 28 shifted to the neutral position, the low forward speed state (low forward speed stage) is produced to transmit the drive at the low forward speed from the first shaft 14 to the second shaft 18. When the second clutch sleeve 28 is shifted to the high forward speed position with the first clutch sleeve 27 shifted to the neutral position, the high forward speed state (high forward speed stage) is produced to transmit the drive at the high forward speed from the first shaft 14 to the second shaft 18. When the first clutch sleeve 27 is shifted to the backward drive position with the second clutch sleeve 28 shifted to the neutral position, the backing state (backward drive stage) is produced to the drive in reverse from the first shaft 14 to the second shaft 18.

Figure 4:
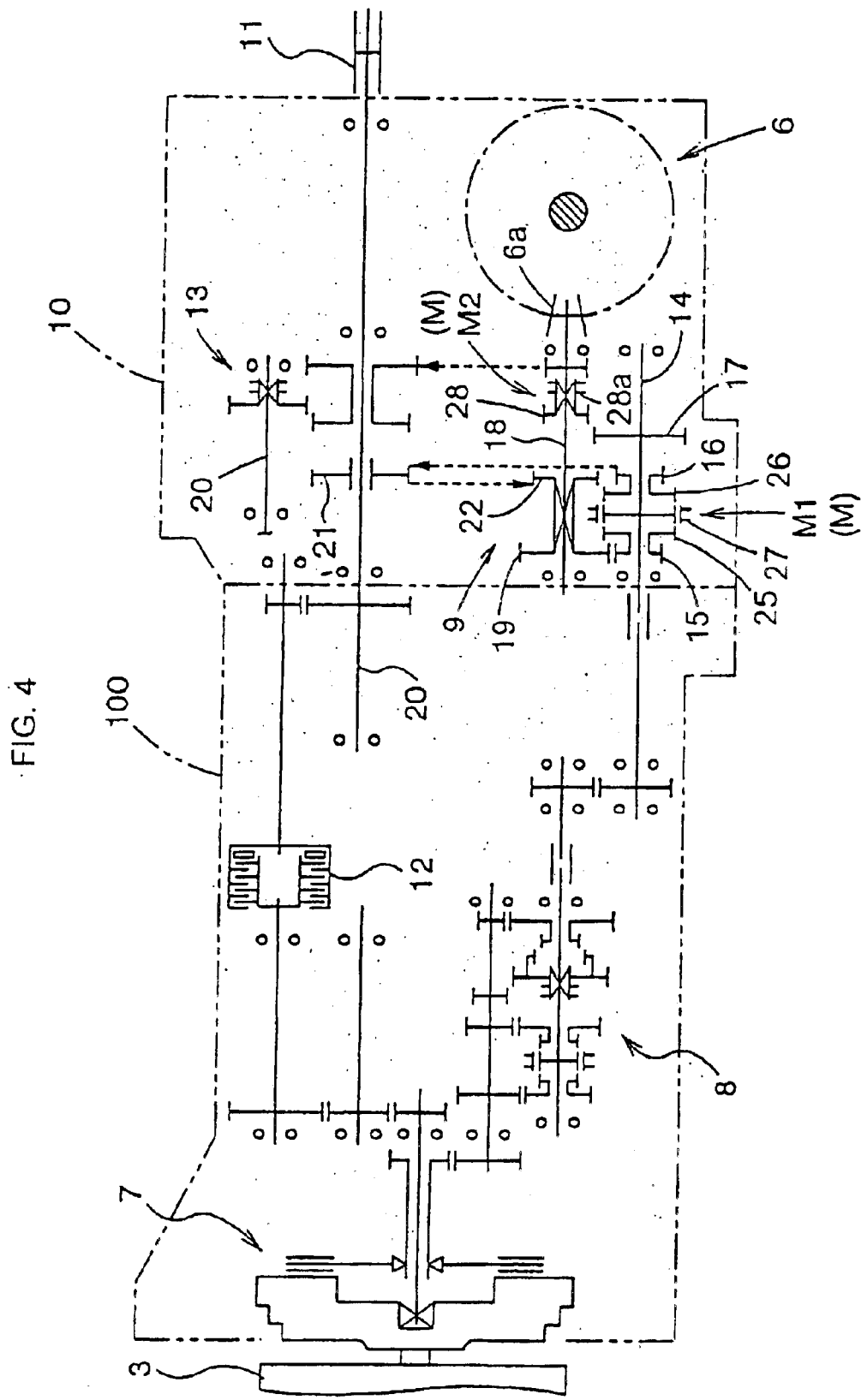
FIG. 4 is a transmission system diagram.

Numeral 13 in FIG. 4 denotes a clutch for transmitting drive taken through a gear train from the second shaft 18 to a transmission shaft 20 for driving the front wheels 1.

Figure 6:
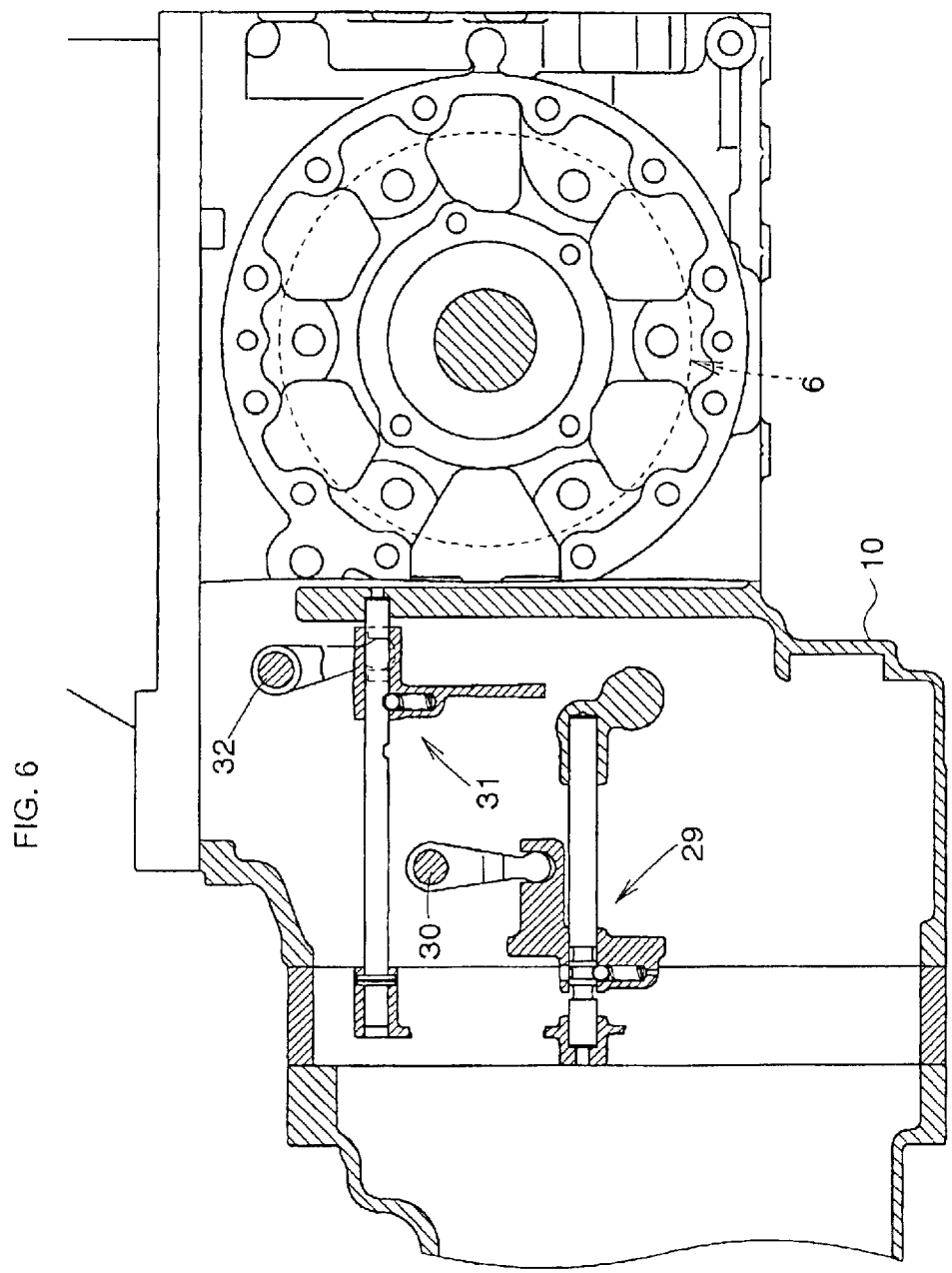
FIG. 6 is a side view in vertical section of an auxiliary shift control.
Figure 7:
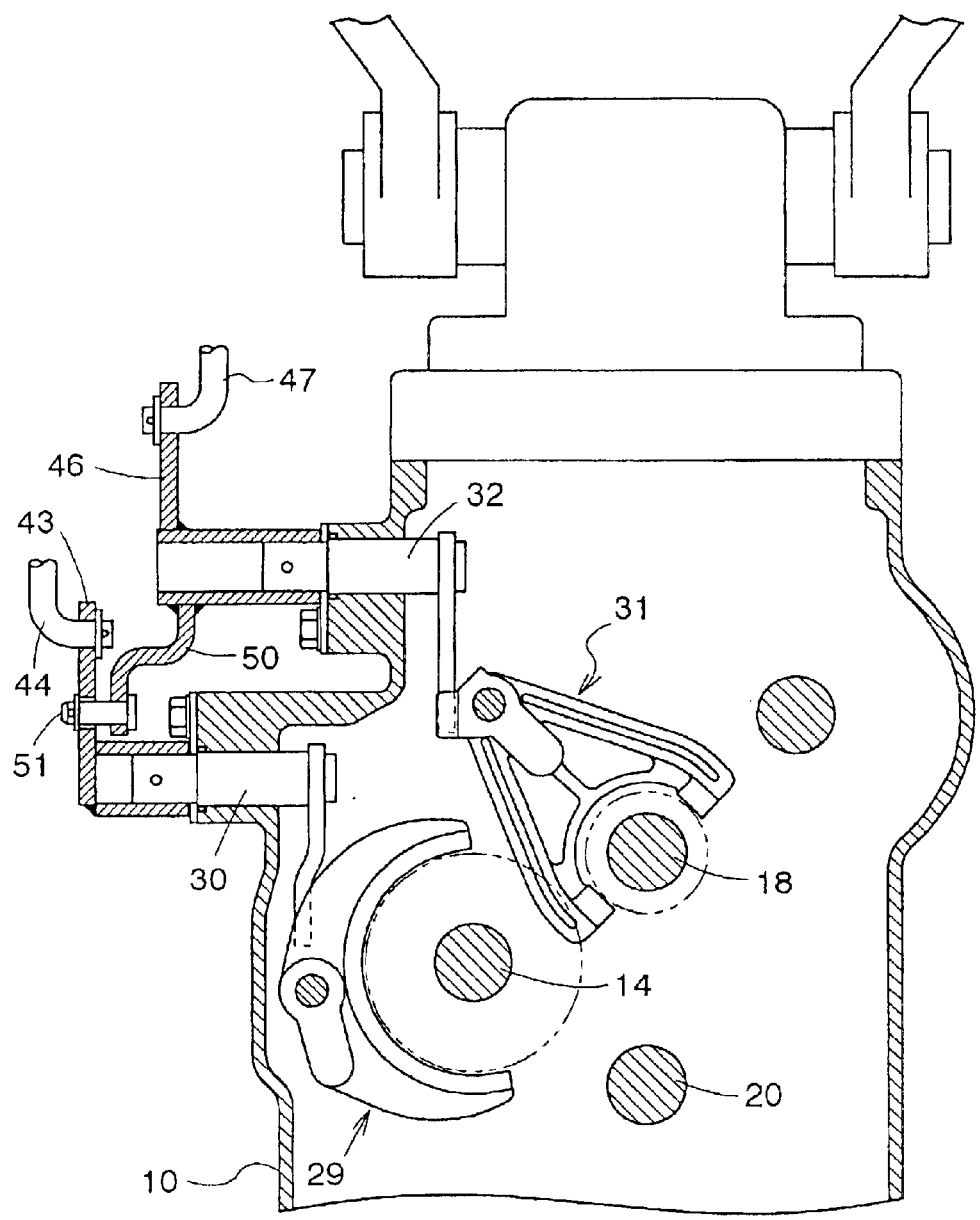
FIG. 7 is a rear view in vertical section of the auxiliary shift control.
Figure 8:
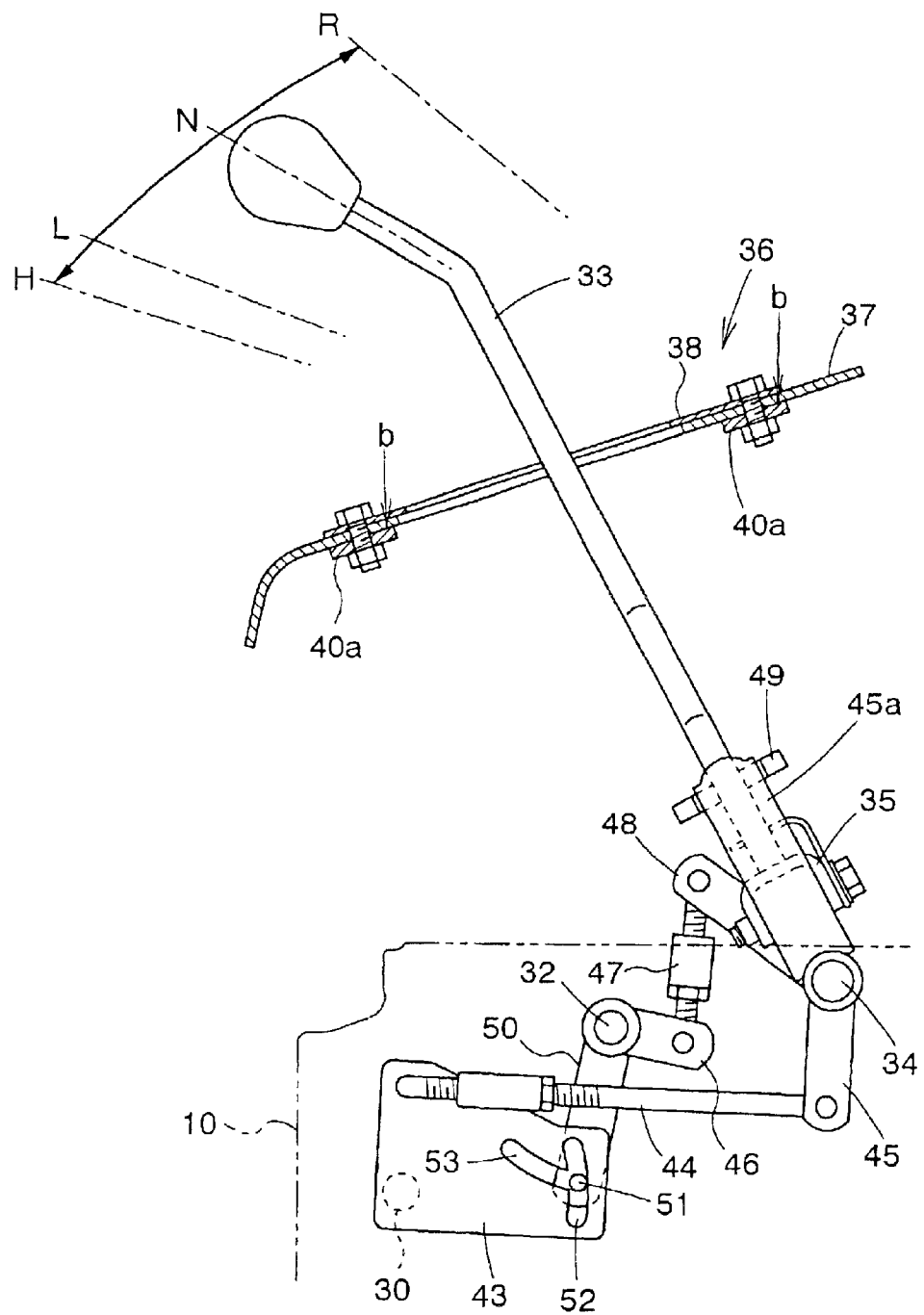
FIG. 8 is an auxiliary shift control system diagram.

As shown in FIGS. 6 through 8, the differential case 10 supports a first shift control shaft 30, a second shift control shaft 32 and a pivot shaft 34 as arranged around the second shaft of the rear wheel differential 6. The first shift control shaft 30 is swingable about a transverse axis to shift the first clutch sleeve 27 through a first shifter unit 29. The second shift control shaft 32 is swingable about a transverse axis to shift the second clutch sleeve 28 through a second shifter unit 31. The pivot shaft 34 supports a shift lever 33 (FIGS. 2 and 3) disposed laterally of the driver's seat 4 for operating the auxiliary change speed device 9.

Figure 9A:
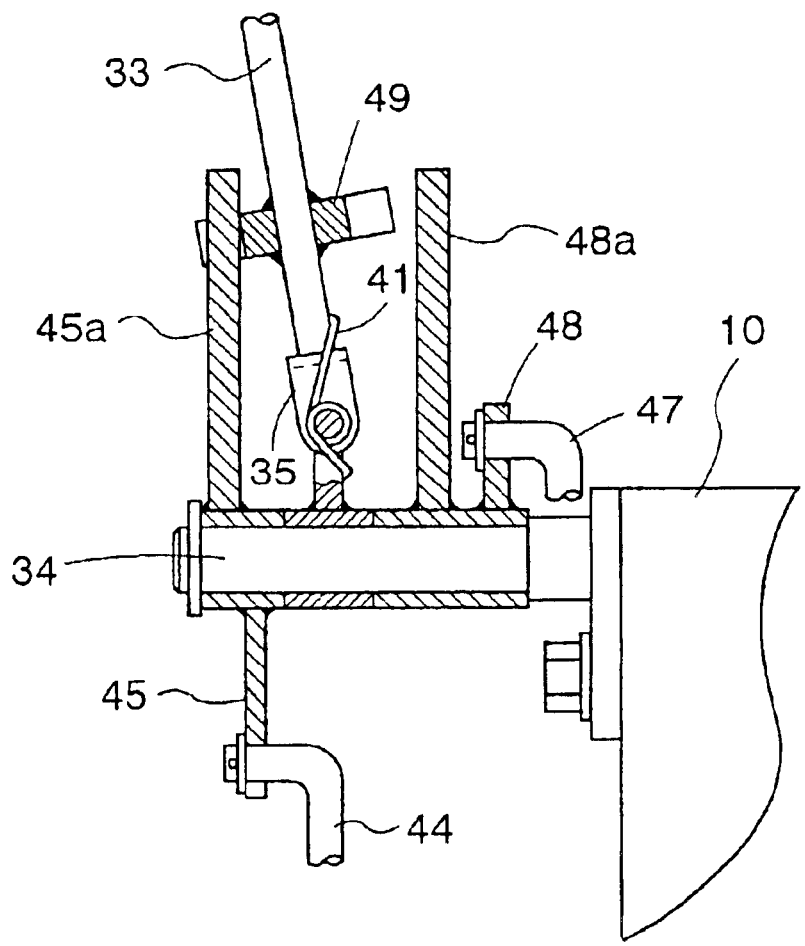
FIG. 9A is a rear view in vertical section of a portion of the auxiliary shift control.
Figure 9B:
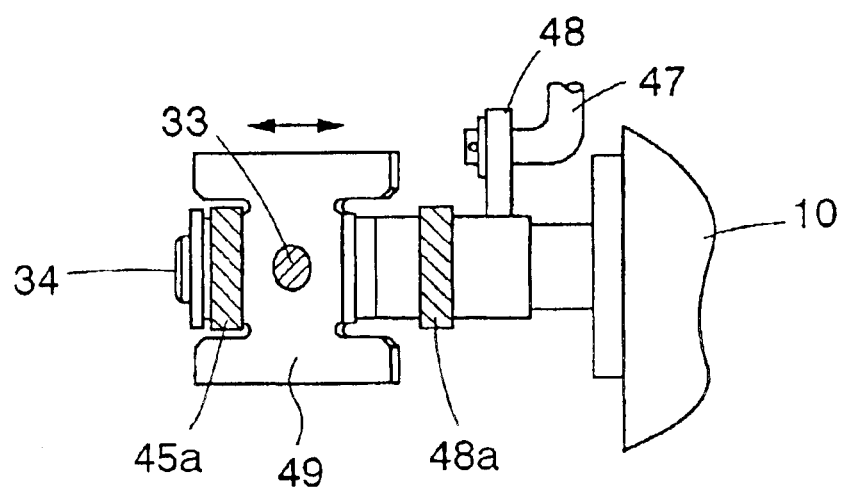
FIG. 9B is a plan view in cross section of the portion of the auxiliary shift control.

As seen from FIGS. 9A and 9B, the shift lever 33 is attached, to be pivotable right and left, to a swing bracket 35 supported by a pivot shaft 34 to be pivotable fore and aft about a pivot shaft axis. Thus, the shift lever 33 may be rocked crosswise, i.e. fore and aft and right and left.

Figure 10:
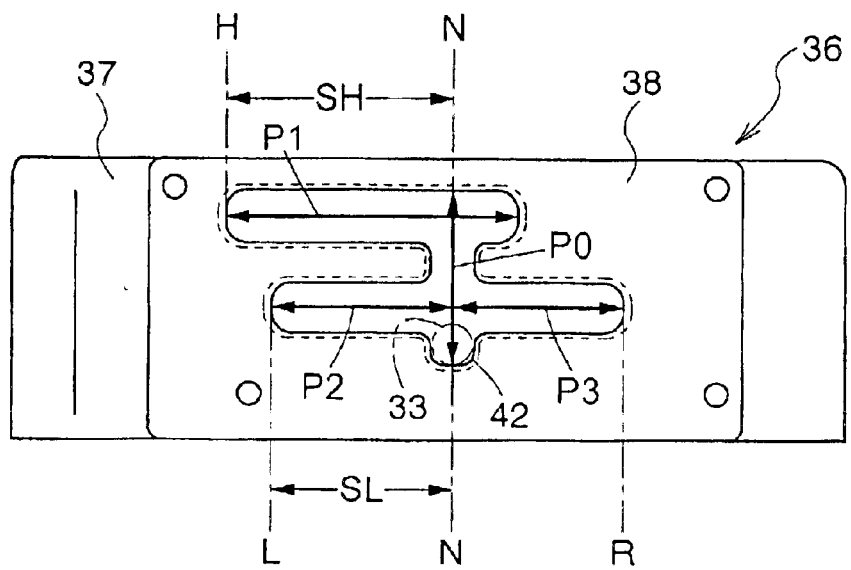
FIG. 10 is a plan view of a shift guide plate.

As control positions of the shift lever 33 for operating the auxiliary change speed device 9, a low forward speed position L, a high forward speed position H, a neutral position (region) N and a reverse position R are defined. As shown in FIG. 10, the low forward speed position L and high forward speed position H are arranged forwardly, with respect to the traveling direction of the tractor, of the neutral position N as spaced from each other. The reverse position R is disposed rearwardly, with respect to the traveling direction of the tractor, of the neutral position N. That is, only the reverse position R is disposed rearwardly of the neutral position N.

Specifically, the shift lever 33 is guided by a shift guide plate 36 to move from one control position to another. The guide plate 36 has a guide groove defining shift control paths. The shift control paths include a transverse control path P0 extending transversely of the vehicle body, a first longitudinal control path P1 extending longitudinally (i.e. in the forward traveling direction of the tractor) from one side of the transverse control path P0, a second longitudinal control path P2 extending longitudinally from the one side of the transverse control path P0 and spaced from the first longitudinal control path P1, and a third longitudinal control path P3 extending longitudinally from the other side of the transverse control path P0. The second longitudinal control path P2 and the third longitudinal control path P3 extend linearly across the transverse control path P0. These control paths will be called a shuttle (reversing operation) control path.

The high forward speed stage is selected when the shift lever 33 is operated to the high forward speed position H provided at the end of the first longitudinal control path P1. The low forward speed stage is selected when the shift lever 33 is operated to the low forward speed position L provided at the end of the second longitudinal control path P2. The backward drive stage is selected when the shift lever 33 is operated to the reverse position R provided at the end of the third longitudinal control path P3. The neutral stage is selected when the shift lever 33 is operated to the neutral position N provided in the transverse control path P0.

The high forward speed position H is disposed more inwardly toward the center of the vehicle body than the low forward speed position L. An operating stroke SH from the neutral position N to the high forward speed position H is larger than an operating stroke SL from the neutral position N to the low forward speed position L.

The shift guide plate 36 for guiding, along the shift control paths, the shift lever 33 extending through the guide groove has a base plate 37 formed of steel sheet, and a surface plate 38 formed of a resin and laminated on the base plate 37. The surface plate 38 guides the shift lever 33 to slide therealong. As shown in FIGS. 2 and 3, rear fenders 39 for the rear wheels 2 are supported by stays 40. The shift guide plate 36 is attached by bolts and nuts to a surface of one of the stays 40 different from a mounting surface thereof supporting the rear fender 39, i.e. cantilevered to an upper surface 40b of an upper bent piece 40a to project toward the driver's seat 4. As shown in FIG. 9A, the shift lever 33 is biased by a spring 41 to the shuttle control path. As shown in FIG. 10, a recess 42 is formed in the neutral position N of the shuttle control path for receiving the shift lever 33 swing sideways. This enables the driver to recognize the neutral position N in the shuttle control path by sense.

FIGS. 8, 9A and 9B show a link mechanism for switching the auxiliary change speed device 9 in response to operation of the shift lever 33. The link mechanism is mounted on the differential case 10 and around the second shaft of rear wheel differential 6. Specifically, a first lever 45 is mounted on the pivot shaft 34 to be swingable fore and aft about the pivot shaft axis to swing, through a first, length-adjustable rod 44, a first control arm 43 mounted on an outward end of the first shift control shaft 30 to be rotatable together. A second lever 48 also is mounted on the pivot shaft 34 to be swingable fore and aft about the pivot shaft axis to swing, through a second, length-adjustable rod 47, a second control arm 46 mounted on an outward end of the second shift control shaft 32 to be rotatable together. The shift lever 33 includes a shift selector 49 fixed thereto, and a mutual check device. The shift selector 49 engages, to be swingable fore and aft together, a first arm 45a swingable with the first lever 45 when the first lever 45 is in a neutral position and the shift lever 33 is swung sideways through the neutral position N to the shuttle control path. The shift selector 49 engages, to be swingable fore and aft together, a second arm 48a swingable with the second lever 48 when the second lever 48 is in a neutral position and the shift lever 33 is swung sideways through the neutral position N to the first longitudinal control path P1.

When the first control arm 43 in a position other than the neutral position, i.e. in a low forward speed position or a reversing position, the mutual check device prevents the second control arm 46 from swinging from the neutral position to a high forward speed position, and maintains the second control arm 46 in the neutral position. When the second control arm 46 is in the high forward speed position, the mutual check device prevents the first control arm 43 from swinging from the neutral position to the low forward speed position or reversing position, and maintains the first control arm 43 in the neutral position.

Specifically, an engaging pin 51 projects from a control arm 50 swingable with the second control arm 46, while the first control arm 43 defines a first slot 52 shaped arcuate about the first shift control shaft 30, and a second slot 53 shaped arcuate about the second shift control shaft 32 with the first control arm 43 in the neutral position, the first slot 52 and second slot 53 being in communication with each other. The engaging pin 51 engaging and moving along the first slot 52 allows swinging of the first control arm 43 while maintaining the second control arm 46 in the neutral position. The engaging pin 51 engaging and moving along the second slot 53 allows swinging of the second control arm 46 while maintaining the first control arm 43 in the neutral position.

[Other Embodiments]

In the above embodiment, the shift control paths include the shuttle control path, and the first longitudinal control path P1 disposed more inwardly of the vehicle body than the shuttle control path. The shift control paths may be modified as shown in FIGS. 11A, 11B, 11C and 11D. The shift control paths shown in FIG. 11A have the shuttle control path (the second longitudinal control path P2 and the third longitudinal control path P3) disposed more inwardly of the vehicle body than the first longitudinal control path P1.

Figure 11A:
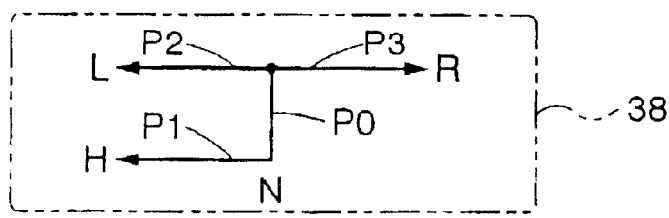
FIGS. 11A, 11B, 11C and 11D are schematic views of modified shift guide paths.
Figure 11B:
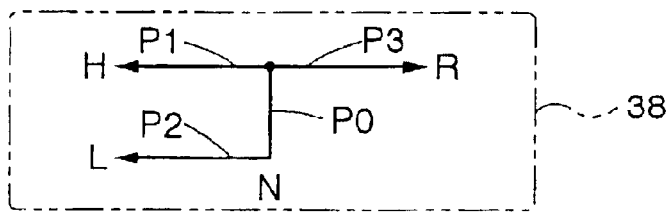

The shift control paths shown in FIG. 11B are laid out so that the first longitudinal control path P1 and third longitudinal control path P3 in alignment.

Figure 11C:
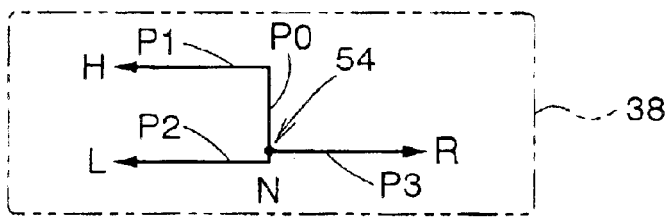

The shift control paths shown in FIG. 11C correspond to those in the foregoing embodiment excepting that the shuttle control path includes a crank portion 54 in the neutral position N. In this case, the crank portion 54 has the same function as the recess 42, and therefore the latter is not formed here.

Figure 11D:
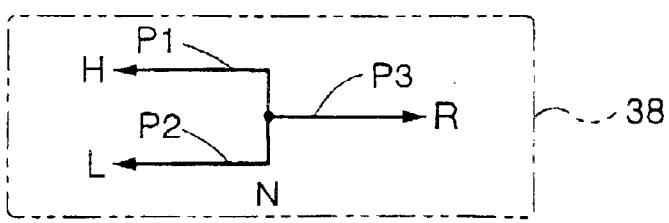

The shift control paths shown in FIG. 11D have, in a transversely varied arrangement, the second longitudinal control path P2 from the neutral position N to the low forward speed position L, the first longitudinal control path P1 from the neutral position N to the high forward speed position H, and the longitudinal control path P3 from the neutral position N to the reverse position R.

Figure 12:
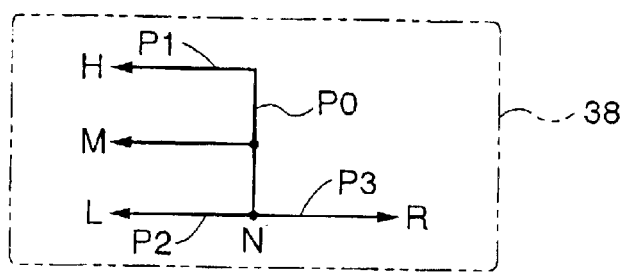
FIG. 12 is a schematic view of another modified shift guide.
Figure 13A:
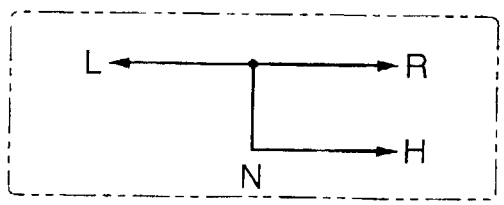
FIGS. 13A and 13B are schematic views of shift guide paths in the prior art.
Figure 13B:
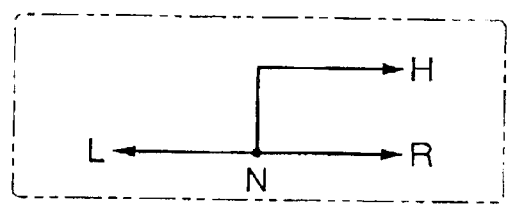

In the foregoing embodiment, the change speed apparatus has the low forward speed position L, high forward speed position H, reverse position R and position neutral N. This invention is applicable also to a change speed apparatus having a medium forward speed position M besides the above positions as shown in FIG. 12.

In the foregoing embodiment, the shift lever 33 is disposed laterally of the driver's seat 4. Instead, the shift lever 33 may be the column shift type disposed on the steering column.

What is claimed is:

1. A change speed apparatus for a working vehicle that engages in an operation while moving forward and backward, comprising:

a first shaft for receiving driving torque from an engine;
   a second shaft for transmitting the driving torque to a rear wheel differential;

a change speed mechanism for changing speed of the driving torque received from said first shaft and transmits the driving torque to said second shaft, said change speed mechanism having a high forward speed stage for changing the speed of the driving torque received from said first shaft to a high forward speed for transmission to said second shaft, a low forward speed stage for changing the speed of the driving torque received from said first shaft to a low forward speed for transmission to said second shaft, a backward drive stage for changing the speed of the driving torque received from said first shaft to a low backward speed for transmission to said second shaft, and a neutral stage; and a shift lever for selectively switching said change speed mechanism to each of said stages, wherein said shift lever is movable along shift control paths including a transverse control path extending in a transverse direction of the working vehicle, a first longitudinal control path extending forward from said transverse control path in a fore and aft direction of the working vehicle, a second longitudinal control path extending forward from said transverse control path in said fore and aft direction and spaced from said first longitudinal control path, and a third longitudinal control path extending rearward from said transverse control path in said fore and aft direction, said high forward speed stage being selected when said shift lever is operated to an end of said first longitudinal control path, said low forward speed stage being selected when said shift lever is operated to an end of said second longitudinal control path, said backward drive stage being selected when said shift lever is operated to an end of said third longitudinal control path, said neutral stage being selected when said shift lever is operated to said transverse control path, said change speed mechanism includes a first gear change unit for selectively switching between said low forward speed stage and said backward drive stage, and a second gear change unit for switching between selection and non-selection of said high forward speed stage, said first gear change unit includes a clutch unit having a clutch hub unrotatably mounted on said first shaft, a clutch sleeve slidably mounted peripherally of said clutch hub, and a first and a second drive gear rotatably mounted on said first shaft and having dog teeth connectable to said clutch sleeve, a first driven gear unrotatably mounted on said second shaft and engageable with said first drive gear, and a second driven gear unrotatably mounted on said second shaft and engageable with said second drive gear through an idler gear, and said second gear change unit includes a third drive gear and a third driven gear mounted on said first shaft and said second shaft, respectively.

2. A change speed apparatus as defined in claim 1, wherein said second longitudinal control path and said third longitudinal control path extend linearly across said transverse control path.

3. A change speed apparatus as defined in claim 1, wherein said change speed mechanism and said rear wheel differential are mounted in a common housing.

4. A change speed apparatus as defined in claim 3, wherein a link mechanism for transmitting operational displacements of said shift lever to said change speed mechanism is arranged on said housing.

5. A change speed apparatus as defined in claim 1, wherein said second shaft has an input gear of said rear wheel differential.

6. A change speed apparatus as defined in claim 1, further comprising a main change speed mechanism disposed between said engine and said first shaft.

7. A change speed apparatus for a working vehicle that engages in an operation while moving forward and backward, comprising:

a first shaft for receiving driving torque from an engine;

a second shaft for transmitting the driving torque to a rear wheel differential;

a change speed mechanism for changing speed of the driving torque received from said first shaft and transmits the driving torque to said second shaft, said change speed mechanism having a high forward speed stage for changing the speed of the driving torque received from said first shaft to a high forward speed for transmission to said second shaft, a low forward speed stage for changing the speed of the driving torque received from said first shaft to a low forward speed for transmission to said second shaft, a backward drive stage for changing the speed of the driving torque received from said first shaft to a low backward speed for transmission to said second shaft, and a neutral stage; and a shift lever for selectively switching said change speed mechanism to each of said stages, wherein said shift lever is movable along shift control paths including a transverse control path extending in a transverse direction of the working vehicle, a first longitudinal control path extending forward from said transverse control path in a fore and aft direction of the working vehicle, a second longitudinal control path extending forward from said transverse control path in said fore and aft direction and spaced from said first longitudinal control path, and a third longitudinal control path extending rearward from said transverse control path in said fore and aft direction, said high forward speed stage being selected when said shift lever is operated to an end of said first longitudinal control path, said low forward speed stage being selected when said shift lever is operated to an end of said second longitudinal control path, said backward drive stage being selected when said shift lever is operated to an end of said third longitudinal control path, said neutral stage being selected when said shift lever is operated to said transverse control path, wherein said change speed mechanism includes a first gear change unit for selectively switching between said low forward speed stage and said backward drive stage, and a second gear change unit for switching between selection and non-selection of said high forward speed stage;

wherein said first gear change unit includes a clutch unit for selectively connecting a first drive gear or a second drive gear to said first shaft, a first driven gear connected to said second shaft and engageable with said first drive gear, and a second driven gear connected to said second shaft and engageable with said second drive gear through an idler gear; and wherein said second gear change unit includes a third drive gear and a third driven gear mounted on said first shaft and said second shaft, respectively.

8. A change speed apparatus as defined in claim 7, wherein said second longitudinal control path and said third longitudinal control path extend linearly across said transverse control path.

9. A change speed apparatus as defined in claim 7, wherein said change speed mechanism and said rear wheel differential are mounted in a common housing.

10. A change speed apparatus as defined in claim 9, wherein a link mechanism for transmitting operational displacements of said shift lever to said change speed mechanism is arranged on said housing.

11. A change speed apparatus as defined in claim 7, wherein said second shaft has an input gear of said rear wheel differential.

12. A change speed apparatus as defined in claim 7, further comprising a main change speed mechanism disposed between said engine and said first shaft.

* * * * *

UNITED STATES PATENT AND TRADEMARK OFFICE
CERTIFICATE OF CORRECTION

PATENT NO. : 6,889,569 B2
DATED : May 10, 2005
INVENTOR(S) : Morimoto et al.

It is certified that error appears in the above-identified patent and that said Letters Patent is hereby corrected as shown below:

<u>Title page,</u>
Item [56], References Cited, FOREIGN PATENT DOCUMENTS, insert the following:
-- JP 11-078574 A 03/1999
JP 7-186769 A 07/1995 --.

Signed and Sealed this

Eighth Day of November, 2005

JON W. DUDAS
*Director of the United States Patent and Trademark Office*